United States Patent
Hinami et al.

(10) Patent No.: US 10,657,404 B2
(45) Date of Patent: May 19, 2020

(54) CHARACTER RECOGNITION DEVICE, CHARACTER RECOGNITION METHOD, AND CHARACTER RECOGNITION PROGRAM

(71) Applicant: Rakuten, Inc., Tokyo (JP)

(72) Inventors: Ryota Hinami, Chiyoda-ku (JP); Naoki Chiba, Setagaya-ku (JP); Xinhao Liu, Setagaya-ku (JP); Shin'ichi Satoh, Chiyoda-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 135 days.

(21) Appl. No.: 15/744,131

(22) PCT Filed: Jul. 17, 2015

(86) PCT No.: PCT/JP2015/070597
§ 371 (c)(1),
(2) Date: Jan. 12, 2018

(87) PCT Pub. No.: WO2017/013719
PCT Pub. Date: Jan. 26, 2017

(65) Prior Publication Data
US 2018/0211127 A1 Jul. 26, 2018

(51) Int. Cl.
*G06K 9/32* (2006.01)
*G06K 9/00* (2006.01)
(Continued)

(52) U.S. Cl.
CPC ....... *G06K 9/3233* (2013.01); *G06K 9/00416* (2013.01); *G06K 9/00422* (2013.01);
(Continued)

(58) Field of Classification Search
None
See application file for complete search history.

(56) References Cited

U.S. PATENT DOCUMENTS

| | | | |
|---|---|---|---|
| 6,473,517 B1* | 10/2002 | Tyan | G06K 9/344 382/105 |
| 2011/0228124 A1* | 9/2011 | Ahn | G06K 9/3283 348/222.1 |
| 2013/0294695 A1* | 11/2013 | Meunier | G06K 9/6828 382/182 |

FOREIGN PATENT DOCUMENTS

| | | | |
|---|---|---|---|
| JP | 3-126188 A | | 5/1991 |
| JP | 2004-310251 | * | 4/2003 |

(Continued)

OTHER PUBLICATIONS

International Preliminary Report on Patentability dated Feb. 1, 2018 from the International Bureau in counterpart International Application No. PCT/JP2015/070597.
(Continued)

*Primary Examiner* — Kevin Ky
(74) *Attorney, Agent, or Firm* — Sughrue Mion, PLLC

(57) ABSTRACT

A character recognition device includes an acquisition means configured to acquire an image containing a character region, a first recognition means configured to recognize a character from the character region by a first recognition method, a setting means configured to set reference lines along an alignment direction of the characters and passing through a specified position in each character, a second recognition means configured to recognize a character by a second recognition method, the second recognition method being a method that recognizes a character from an image within a recognition window by scanning in a recognition target region in an image while changing a size of the recognition window, and configured to set a position or a height in a vertical direction of the recognition window based on the reference lines, and an output means configured to output a word composed of characters recognized by the second recognition means.

11 Claims, 12 Drawing Sheets

(51) Int. Cl.
*G06K 9/46* (2006.01)
*G06K 9/62* (2006.01)

(52) U.S. Cl.
CPC ......... *G06K 9/4642* (2013.01); *G06K 9/6262* (2013.01); *G06K 9/6267* (2013.01); *G06K 9/6269* (2013.01); *G06K 2209/01* (2013.01)

(56) References Cited

FOREIGN PATENT DOCUMENTS

| | | |
|---|---|---|
| JP | 2004-310251 A | 11/2004 |
| JP | 2007-524949 A | 8/2007 |
| WO | 2005/077098 A2 | 8/2005 |

OTHER PUBLICATIONS

International Search Report dated Oct. 20, 2015 from the International Bureau in counterpart International Application No. PCT/JP2015/070597.
Wang et al., "End-to-End Text Recognition with Convolutional Neural Networks," Stanford University; URL:http://ai.stanford.edu/~ang/papers/ICPR12-TextRecognitionConvNeuralNets.pdf, Online, Searched on Jul. 10, 2015 (5 pages total).

* cited by examiner

*Fig.5*

| No. | RECOGNITION RESULT | RELIABILITY SCORE |
|---|---|---|
| 1 | S | 85 |
| 2 | x | 30 |
| 3 | t | 75 |

CHARACTER RECOGNITION DEVICE, CHARACTER RECOGNITION METHOD, AND CHARACTER RECOGNITION PROGRAM

CROSS REFERENCE TO RELATED APPLICATIONS

This application is a National Stage of International Application No. PCT/JP2015/070597 filed Jul. 17, 2015, the contents of all of which are incorporated herein by reference in their entirety.

TECHNICAL FIELD

The present invention relates to a character recognition device, a character recognition method, and a character recognition program.

BACKGROUND ART

There is an increasing demand for character recognition from an image taken by a camera or the like. As a method to recognize characters contained in an image, a technique with high recognition accuracy called Sliding Window is known, for example (see Non Patent Literature 1, for example). This technique sets a window with a certain size for character recognition and performs character recognition in the set window, and it scans the window all over the detection target image repeatedly while changing the window size little by little.

CITATION LIST

Non Patent Literature

NPL1: End-to-End Text Recognition with Convolutional Neural Networks, [online], [Searched on Jul. 10, 2015], Internet <http://ai.stanford.edu/~ang/papers/ICPR12-TextRecognitionConvNeuralNets.pdf>

SUMMARY OF INVENTION

Technical Problem

Because the above-described technique according to related art performs character recognizing by scanning all over an extraction target region while changing the size of a window for character recognition, it imposes a heavy processing load.

In view of the foregoing, an object of the present invention is to achieve character recognition from an image with high recognition accuracy and with a low processing load.

Solution to Problem

To solve the above problem, a character recognition device according to one aspect of the present invention includes an acquisition means configured to acquire an image containing a character region, a first recognition means configured to recognize a character from the character region of the image by a first recognition method, a setting means configured to set, for at least some of a plurality of characters recognized by the first recognition means, at least one reference line along an alignment direction of the plurality of characters and passing through a specified position in each character, a second recognition means configured to recognize a character by a second recognition method, the second recognition method being a method that recognizes a character from an image within a recognition window by scanning in a recognition target region in an image while changing a size of the recognition window, and configured to set a position or a height in a vertical direction of the recognition window based on at least one reference line out of the reference lines set by the setting means in the character region, and an output means configured to output, as a recognition result, a word composed of characters recognized by the second recognition means.

A character recognition method according to one aspect of the present invention is a character recognition method in a character recognition device the method including an acquisition step of acquiring an image containing a character region, a first recognition step of recognizing a character from the character region of the image by a first recognition method, a setting step of setting, for at least some of a plurality of characters recognized in the first recognition step, at least one reference line along an alignment direction of the plurality of characters and passing through a specified position in each character, a second recognition step of recognizing a character by a second recognition method, the second recognition method being a method that recognizes a character from an image within a recognition window by scanning in a recognition target region in an image while changing a size of the recognition window, and setting a position or a height in a vertical direction of the recognition window based on at least one reference line out of the reference lines set in the setting step in the character region, and an output step of outputting, as a recognition result, a word composed of characters recognized in the second recognition step.

A character recognition program according to one aspect of the present invention causes a computer to function as a character recognition device, the program causing the computer to function as an acquisition means configured to acquire an image containing a character region, a first recognition means configured to recognize a character from the character region of the image by a first recognition method, a setting means configured to set, for at least some of a plurality of characters recognized by the first recognition means, at least one reference line along an alignment direction of the plurality of characters and passing through a specified position in each character, a second recognition means configured to recognize a character by a second recognition method, the second recognition method being a method that recognizes a character from an image within a recognition window by scanning in a recognition target region in an image while changing a size of the recognition window, and configured to set a position or a height in a vertical direction of the recognition window based on at least one reference line out of the reference lines set by the setting means in the character region, and an output means configured to output, as a recognition result, a word composed of characters recognized by the second recognition means.

According to the above aspects, reference lines are set for characters recognized from character regions by the first recognition method. Then, the position or the height of the recognition window in the vertical direction in the second recognition method are set based on the set reference lines to limit a recognition range, and it is thereby possible to reduce the load on recognition processing. Further, because character recognition processing is performed in limited regions having high probability of showing characters in the character regions, it is possible to maintain the recognition accuracy.

In the character recognition device according to another aspect, the setting means may set at least two reference lines, and the second recognition means may set the position and the height in the vertical direction of the recognition window to a position and a height of a scanning region specified by predetermined two reference lines out of the plurality of reference lines set by the setting means in the character region.

According to the above aspect, at least two reference lines are set for characters recognized from character regions by the first recognition method. Then, the position and the height of the recognition window in the vertical direction in the second recognition method are set to the position and the height of a scanning region specified by the set reference lines, and it is thereby possible to reduce the load on recognition processing.

In the character recognition device according to another aspect, the setting means sets the reference line for the plurality of characters by referring to a storage means that stores information about a position of each reference line for each character.

According to the above aspect, because information about the positions of reference lines is stored in advance, it is possible to set appropriate reference lines to recognized characters. The information about the position of each reference line for each character is generated and stored based on the position of a reference line for each character in various fonts.

In the character recognition device according to another aspect, the first recognition means may calculate a first reliability score indicating probability of a recognition result for each recognized character, and the setting means may set the reference line for a character where the first reliability score is equal to or more than a specified value.

According to the above aspect, reference lines are set for characters with high reliability in a recognition result among the characters recognized by the first recognition method, and it is thereby possible to set reference lines at appropriate positions.

In the character recognition device according to another aspect, the second recognition means may perform character recognition in a region showing a character where the first reliability score is less than a specified value, and the output means may output, as a recognition result, a word composed of characters recognized by the first recognition means and the second recognition means.

According to the above aspect, recognition processing by the second recognition method is not performed again for characters with high reliability in a recognition result among the characters recognized by the first recognition method, and it is thereby possible to reduce the amount of processing.

In the character recognition device according to another aspect, the second recognition means may calculate a second reliability score indicating probability of a recognition result for each recognized character, and the output means may output, as a recognition result, a word made up of a character string formed based on the second reliability score of each character.

According to the above aspect, a character string composed of characters with high reliability in a recognition result is output as a recognition result, and it is thereby possible to improve the accuracy of the output word.

In the character recognition device according to another aspect, the output means may calculate an evaluation score indicating likelihood as a word composed of a plurality of characters recognized by the second recognition means, and output a word as a recognition result based on the calculated evaluation score.

According to the above aspect, a word is output as a recognition result based on the likelihood as a word composed of a plurality of characters, and it is thereby possible to improve the recognition accuracy as a word.

In the character recognition device according to another aspect, the characters may be alphabets, and the setting means may set, as the reference line, an ascender line, a mean line, a base line and a descender line.

According to the above aspect, it is possible to set appropriate reference lines for alphabetic character string to be recognized.

In this aspect, the second recognition means may specify, as a scanning region, an area between the ascender line and the base line, an area between the mean line and the base line, and an area between the mean line and the descender line.

According to the above aspect, a region in which various alphabetic characters are shown is specified as a scanning region, it is possible to improve the recognition accuracy of alphabets.

Advantageous Effects of Invention

According to one aspect of the present invention, it is possible to achieve character recognition from an image with high recognition accuracy and with a low processing load.

BRIEF DESCRIPTION OF DRAWINGS

FIG. 5 is a view showing an example of a first reliability score calculated in the first recognition method.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
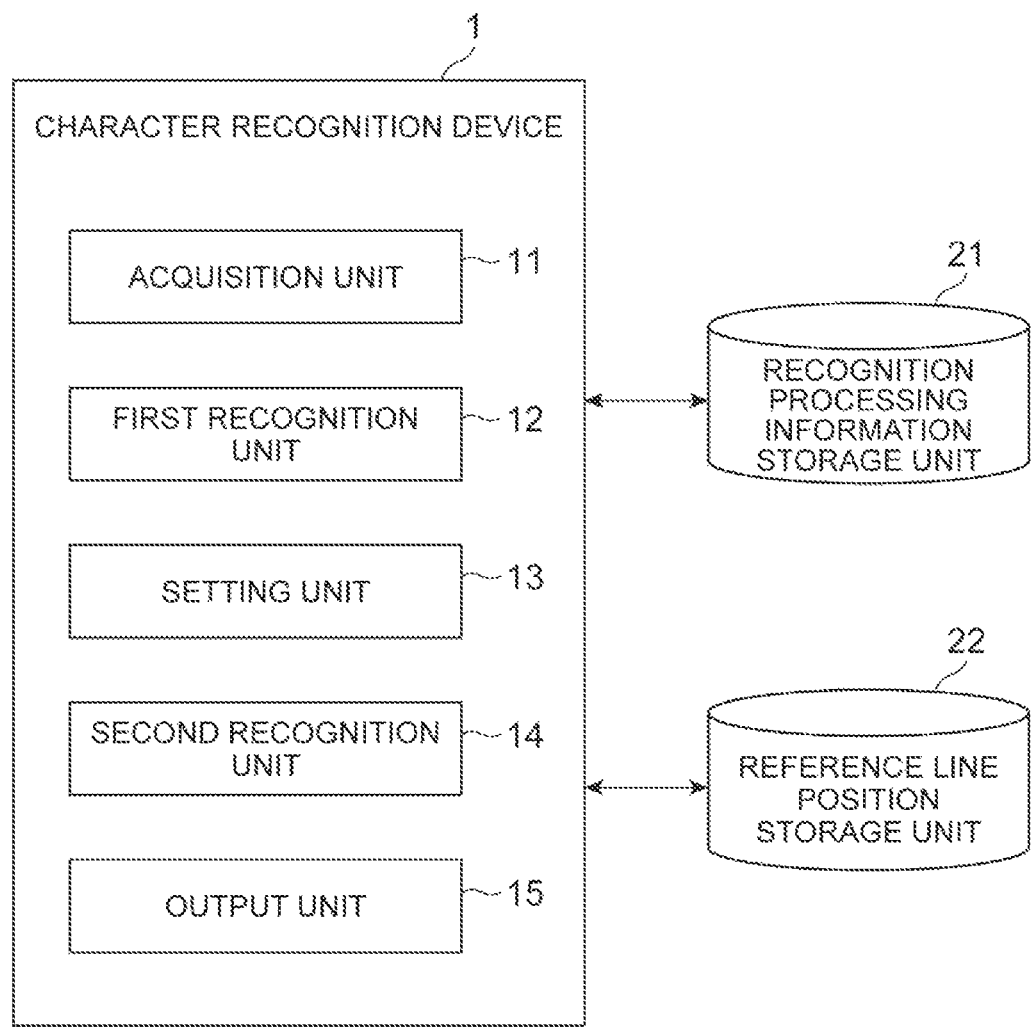
FIG. 1 is a block diagram showing a functional configuration of a character recognition device.

FIG. 1 is a block diagram showing a functional configuration of a character recognition device 1 according to this embodiment. The character recognition device 1 is a device that recognizes characters from an image and outputs a word composed of the recognized characters. The image is an image taken by a camera, for example. A scenic image taken by a camera or the like contains various kinds of character information such as road signs and advertising signs, for example. Characters in a scene image, compared with characters printed on paper, have many problems that make recognition difficult, such as having a unique font or style and having a low resolution.

The character recognition device 1 according to this embodiment recognizes characters from an image initially, sets reference lines along which characters to be arranged should be aligned for the recognized characters, scans a region specified by the reference lines and recognizes characters again. Then, the character recognition device 1 outputs a word composed of the recognized characters as a recognition result.

The reference lines are virtual lines along which characters to be arranged should be aligned and, in the case where the characters are alphabets, they are four lines: an ascender line, a mean line, a base line, and a descender line.

As shown in FIG. 1, the character recognition device 1 functionally includes an acquisition unit 11 (acquisition means), a first recognition unit 12 (first recognition means), a setting unit 13 (setting means), a second recognition unit 14 (second recognition means), and an output unit 15 (output means).

Further, the character recognition device 1 can access storage means such as a recognition processing information storage unit 21 and a reference line position storage unit 22. The recognition processing information storage unit 21 and the reference line position storage unit 22 may be included in the character recognition device 1 or may be configured as external storage means that are accessible from the character recognition device 1.

Figure 2:
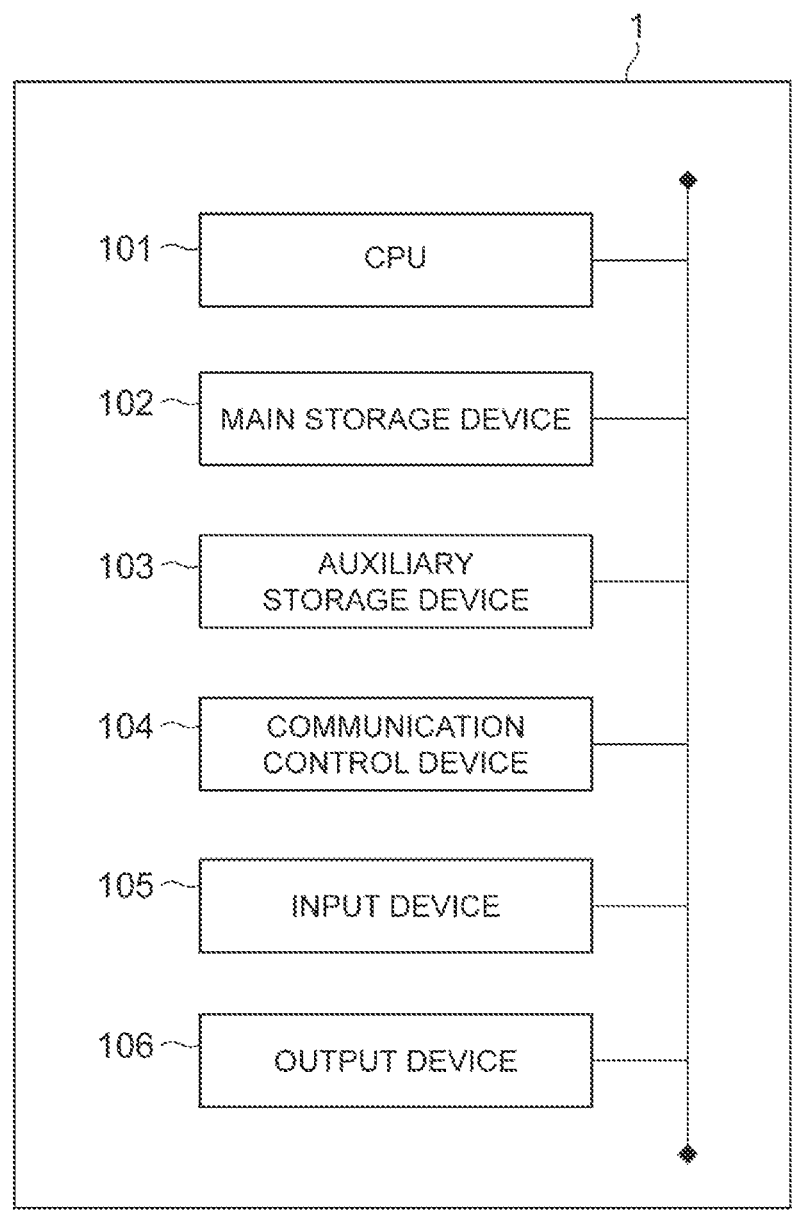
FIG. 2 is a view showing a hardware configuration of the character recognition device.

FIG. 2 is the hardware configuration diagram of the character recognition device 1. As shown in FIG. 2, the character recognition device 1 is physically configured as a computer system that includes a CPU 101, a main storage device 102 such as memory like RAM and ROM, an auxiliary storage device 103 such as a hard disk, a communication control device 104 and the like. The information display device 1 may further include an input device 105 such as a keyboard, a touch panel and a mouse, an output device 106 such as a display and the like.

The functions shown in FIG. 1 are implemented by loading given computer software onto hardware such as the CPU 101 or the main storage device 102 shown in FIG. 2, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

Figure 3:
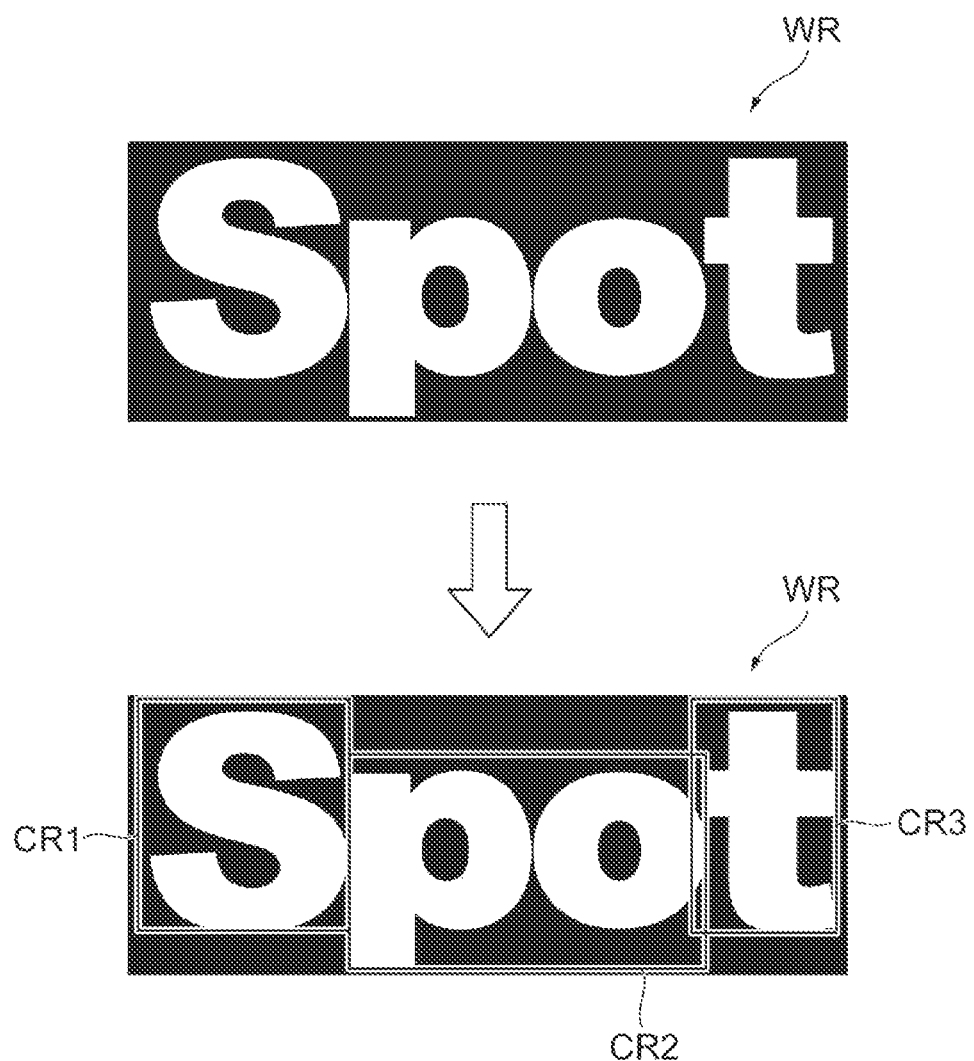
FIG. 3 is a view showing an example of an image for character recognition and setting of character regions.

The functional units of the character recognition device 1 are described hereinafter. The acquisition unit 11 is a part that acquires images of character regions included in an image. The acquisition unit 11 acquires character regions containing characters in an image taken by a camera, for example. As shown in FIG. 3, the acquisition unit 11 acquires a rectangular region WR that includes character regions CR1 to CR3. The acquisition unit 11 may acquire an image where the rectangular region WR is provided in advance. For example, binarization is performed on an acquired image, and connected regions where pixels having the same value are placed successively are detected as the character regions CR1 to CR3. The rectangular region WR is set as a region that includes a plurality of connected regions located within a predetermined distance from one another.

The first recognition unit 12 is a part that recognizes characters from character regions included in an image by means of a first recognition method. For example, as shown in FIG. 3, the first recognition unit 12 detects the character regions CR1 to CR3 from the rectangular region WR of the image. Each of the character regions CR1 to CR3 is a connected region. Note that character regions may be extracted by detecting connected regions by the first recognition unit 12.

For example, the first recognition unit 12 performs character recognition in character regions by using a so-called character classifier. An example of the method using a character classifier is a known method called HOG (Histgram of Oriented Gradient)-SVM (Support Vector Machine), for example. The HOG-SVM is a method that uses the HOG feature as a feature quantity and uses a known SVM as a classifier.

Information to be referred to for character recognition by the character classifier is previously stored in a storage means. The recognition processing information storage unit 21 is a storage means that stores a variety of information that is referred to for character recognition using the character classifier by the HOG-SVM, for example. The recognition processing information storage unit 21 stores data learned about uppercase alphabetic characters A to Z, lowercase alphabetic characters a to z and numeric characters 0 to 9, for example.

The HOG feature is a feature quantity that represents the gradient direction of the luminance of a local region (cell) in an image by a histogram. Cells composed of a specified number of pixels are set to be arranged all over an image from which characters are to be recognized, a multi-dimensional feature vector of the HOG feature is acquired for each cell, and further a multi-dimensional feature vector of all connected cells is acquired from the whole image. Note that, in character classification by the HOG-SVM, it is preferred to further use the aspect ratio.

The first recognition unit 12 acquires the HOG feature vector and the aspect ratio vector from the character region. Based on the acquired vectors, the first recognition unit 12 performs classification using the SVM classifier by reference to the learning data stored in the recognition processing information storage unit 21. As a result, the first recognition unit 12 can acquire characters (alphabetic characters and numeric characters) as classification results and reliability scores output from the classifier.

Note that, although the first recognition unit 12 performs character recognition by using a character classifier such as the HOG-SVM in this embodiment, the first recognition method is not limited to a method using a character classifier. Because the character recognition by the first recognition unit 12 is character recognition that is carried out initially prior to final character recognition in this embodiment, it is possible to apply various known methods as long as they are capable of character recognition from an image. The first recognition method may be any method as long as the processing load is lower and the processing time is shorter than those of the second recognition method, which is described later. Note that, as described later, the first recognition method is preferably a method that can acquire information about the reliability of a recognition result of each character.

Figure 4:
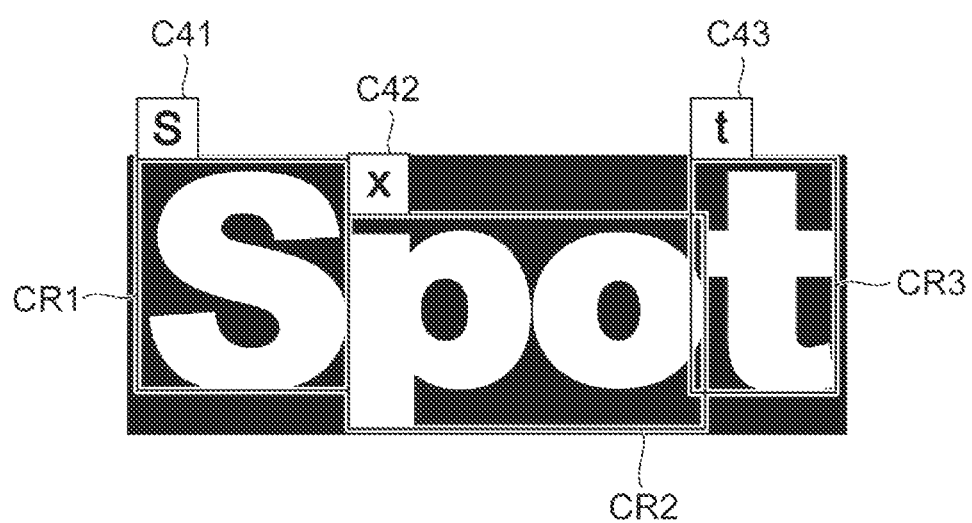
FIG. 4 is a view showing an example of character recognition by a first recognition method.

FIG. 4 is a view showing an example of a result of character recognition by the first recognition unit 12. In this example, the first recognition unit 12 recognizes characters C41 to C43 from the character regions CR1 to CR3, respectively. To be specific, the first recognition unit 12 recognizes the uppercase alphabetic character "S", the lowercase alphabetic character "x" and the lowercase alphabetic character "t" from the character regions CR1 to CR3, respectively. In this manner, there is a case where a recognition result by the recognition unit 12 can include false detection.

For example, in the character region CR2, false recognition occurs because a region in which the character "p" is shown and a region in which the character "o" is shown are connected and they are recognized together as one character "x". Further, false recognition can also occur because it is unclear which of two regions classified by binarization of a recognition target image a character is composed of. Furthermore, false recognition can occur due to various reasons in the recognition by the first recognition unit 12.

The first recognition unit 12 calculates a first reliability score indicating the probability of a recognition result for each recognized character. The first recognition unit 12 can calculate the reliability score by a known method in accordance with the method used as the first recognition method. In the HOG-SVM according to this embodiment also, the reliability score is calculated subsequent to the character recognition. Specifically, in the case where the method by the HOG-SVM is used as the first recognition method, the first recognition unit 12 can calculate the first reliability score for each character, together with a recognition result, as a result of classification by the HOG-SVM.

FIG. 5 is a view showing an example of the calculated reliability score. As shown in FIG. 5, the first recognition unit 12 calculates the reliability score "85" for the recognition result "S" of the character C41 in the character region CR1. Likewise, the first recognition unit 12 calculates the reliability score "30" for the recognition result "x" of the character C42 in the character region CR2, and calculates the reliability score "75" for the recognition result "t" of the character C43 in the character region CR3.

The setting unit 13 is a part that sets, for at least some of a plurality of characters recognized by the first recognition unit 12, at least one reference line that is along the alignment direction of the plurality of characters and that passes through a specified position in each character. To be specific, the setting unit 13 sets reference lines for characters recognized by the first recognition unit 12 by referring to the reference line position storage unit 22.

The reference line position storage unit 22 is a storage means that stores information about the position of each reference line for each character. To be specific, the reference line position storage unit 22 stores, for each character, line position information about positions in the vertical direction through which a reference line of each character passes.

In this embodiment, the reference line position storage unit 22 stores, for each character, line position information through which four reference lines, i.e., the ascender line, the mean line, the base line and the descender line, along which alphabetic characters should be aligned pass.

The line position information may be generated based on a large amount of learning data, for example. The learning data includes images of words represented by various fonts and positions of reference lines identified as being correct which are set for those words. The character recognition device 1 may acquire a plurality of positions of reference lines for each character based on such learning data, statistically processes the acquired positions and generates the line position information, and store the line position information in advance. Note that the line position information may be represented as dots or represented by the Gaussian distribution.

Figure 6:
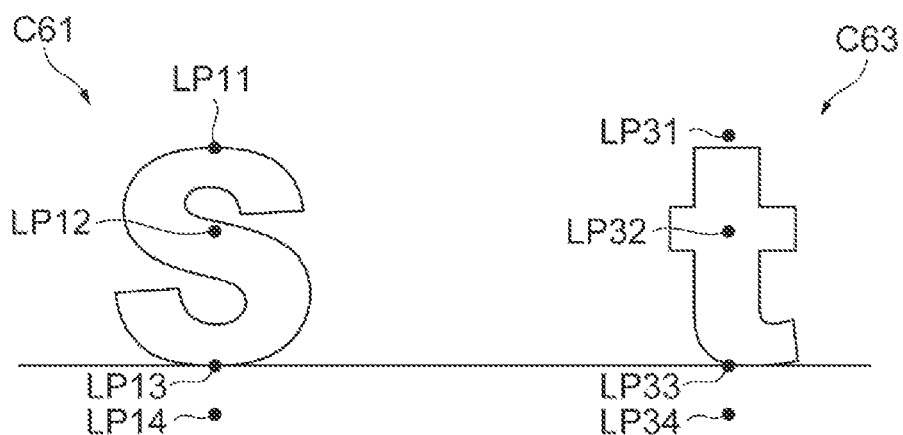
FIG. 6 is a view showing positions through which a reference line passes in characters.

FIG. 6 is a view showing an example of line positions of characters that are set based on the line position information stored in the reference line position storage unit 22. As shown in FIG. 6, the setting unit 13 sets line positions LP11 to LP14 for the character C61, which is the uppercase alphabetic character "S". The line positions LP11 to LP14 respectively indicate the positions through which the ascender line, the mean line, the base line and the descender line in the uppercase alphabetic character "S" pass. Further, the setting unit 13 sets the line positions LP31 to LP34 for the character C63, which is the lowercase alphabetic character "t". The line positions LP31 to LP34 respectively indicate the positions through which the ascender line, the mean line, the base line and the descender line in the lowercase alphabetic character "t" pass.

The setting unit 13 sets reference lines for characters contained in the rectangular region WR based on the line position information. In this embodiment, the setting unit 13 sets four reference lines, which are the ascender line, the mean line, the base line and the descender line. Note that, although the setting unit 13 sets four reference lines in this embodiment, one to three reference lines may be set, or five or more reference lines may be set. For example, the setting unit 13 may set one reference line along which the lower ends of characters are to be placed. Further, in the case where characters are Japanese such as hiragana, katakana and kanji characters, two reference lines along which the upper ends and the lower ends of characters are to be placed may be set.

Figure 7:
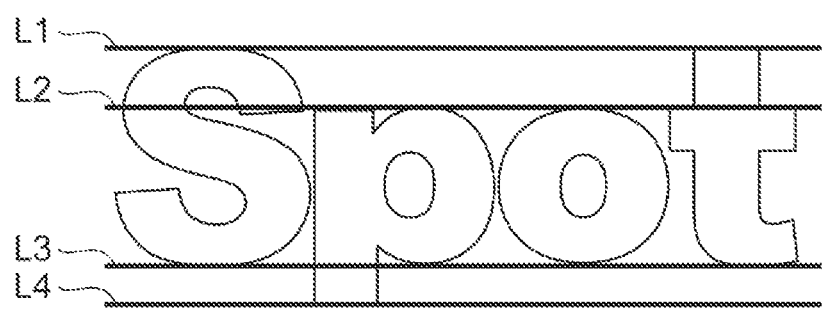
FIG. 7 is a view showing an example of reference lines that are set for recognized characters.

FIG. 7 is a view showing an example where four reference lines are set for characters contained in the rectangular region WR. As shown in FIG. 7, the setting unit 13 sets the reference lines L1 to L4 (the ascender line, the mean line, the base line and the descender line) for the characters contained in the rectangular region WR based on the line position information of the characters recognized by the first recognition unit 12.

To be specific, the setting unit 13 may acquire the line position information of each reference line for each character recognized in the rectangular region WR, and set a reference line at an average position of line positions indicated by a plurality of line position information for each reference line, for example. Further, in the case where the line position information of each character is represented by the Gaussian distribution, the setting unit 13 may summarize the distribution of line positions of each character for each reference line, and set a reference line at the position indicated by the average of summation values.

Further, the setting unit 13 may set reference lines for characters whose first reliability score calculated by the first recognition unit 12 is equal to or more than a specified value. For example, when the specified value for the first reliability score is "70", the setting unit 13 performs the setting of reference lines by using "S" (character region CR1) with the reliability score "85" and "t" (character region CR3) with the reliability score "75" among the characters recognized by the first recognition unit 12, and does not use the character region CR2 for the setting of reference lines. In this manner, by setting reference lines for characters with high reliability in a recognition result among the characters recognized by the first recognition method, the possibility of setting reference lines at appropriate positions increases.

Note that, although the case where each reference line is a straight line is shown in this embodiment, each reference line may be a quadratic curve, a Bezier curve, a spline curve or the like, for example. Further, although four reference lines having the same slope are set in this embodiment, the slope of each reference line may be different from one another. For example, each reference line may have the slope with which the four reference lines converge at one point.

The second recognition unit 14 is a part that recognizes characters by means of a second recognition method. The second recognition method is a method that recognizes characters from an image within a recognition window by scanning in a recognition target region in an image while changing the size of the recognition window. The second recognition unit 14 recognizes characters by the second recognition method by setting a position or a height in the vertical direction of the recognition window based on at least one of reference lines set by the setting means in the character region.

In this embodiment, the second recognition unit 14 specifies a scanning region by two reference lines out of the four reference lines L1 to L4 that are set by the setting unit 13, and sets the position and the height in the vertical direction of the recognition window to the position and the height of the specified scanning region and thereby performs character recognition.

Figure 8:
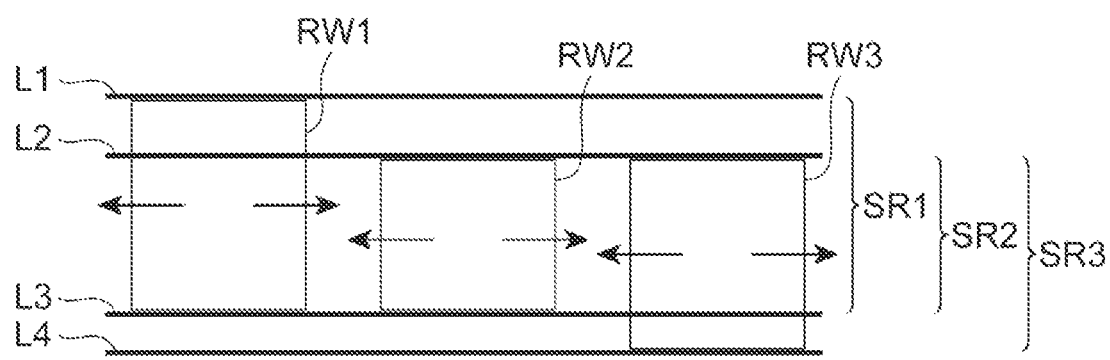
FIG. 8 is a view showing an example of scanning regions.

FIG. 8 is a view showing an example of specifying scanning regions. To be specific, as shown in FIG. 8, the second recognition unit 14 specifies, as the scanning region SR1, the area between the reference line L1 that serves as the ascender line and the reference line L3 that serves as the base line in the rectangular region WR including the character regions. Further, the second recognition unit 14 specifies, as the scanning region SR2, the area between the reference line L2 that serves as the mean line and the reference line L3 that serves as the base line, and specifies, as the scanning region SR3, the area between the reference line L2 that serves as the mean line and the reference line L4 that serves as the descender line. All alphabetic characters are included in any of the scanning regions SR1 to SR3 without exception.

Specifically, the scanning region SR1 is supposed to contain uppercase alphabetic character, some of lowercase alphabetic characters (b, d, f, h, i, k, l, t) and numeric characters, for example, and it is possible to recognize those characters highly accurately and efficiently by character recognition processing limited to the scanning region SR1.

Further, the scanning region SR2 is supposed to contain many of lowercase alphabetic characters, for example, and it is possible to recognize those characters highly accurately and efficiently by character recognition processing limited to the scanning region SR2.

Specifically, the scanning region SR3 is supposed to contain some of lowercase alphabetic characters (g, j, p, q), for example, and it is possible to recognize those characters highly accurately and efficiently by character recognition processing limited to the scanning region SR3.

The second recognition method performed by the second recognition unit 14 is a method that recognizes characters from an image within a recognition window by scanning in a recognition target region in an image while changing the size of the recognition window. In such a method, if recognition processing is performed on the whole area of the character region, it is necessary to scan all over the character region by the recognition window that is set to a certain size and it is also necessary to repeat scanning all over the character region with the recognition window in each size while changing the size of the recognition window little by little, which increases the processing load for recognition processing. In this embodiment, recognition processing is performed by setting the position and the height in the vertical direction of the recognition window to the position and the height of the scanning region specified by reference lines, and it is thereby possible to achieve high accuracy of character recognition and reduce a processing load.

The second recognition unit 14 sets the position and the height in the vertical direction of the recognition window RW1 to the position and the height of the scanning region SR1 as shown in FIG. 8. Then, the second recognition unit 14 recognizes a character from an image within the recognition window RW1, changing the position and the width in the horizontal direction of the recognition window RW1 little by little.

Further, the second recognition unit 14 sets the position and the height in the vertical direction of the recognition window RW2 to the position and the height of the scanning region SR2. Then, the second recognition unit 14 recognizes a character from an image within the recognition window RW2, changing the position and the width in the horizontal direction of the recognition window RW2 little by little.

Furthermore, the second recognition unit 14 sets the position and the height in the vertical direction of the recognition window RW3 to the position and the height of the scanning region SR3. Then, the second recognition unit 14 recognizes a character from an image within the recognition window RW3, changing the position and the width in the horizontal direction of the recognition window RW3 little by little.

The second recognition method is a technique called Sliding Window, for example. This technique sets a window in a certain size for character recognition and performs character recognition processing within the set window, and it is a technique that repeatedly performs scanning of a window all over a detection target image while changing the window size little by little. Character recognition by a so-called character classifier is performed on an image in the set window. This character recognition may be the HOG-SVM, for example. Because the Sliding Window performs character recognition processing by scanning the window for character recognition in the whole area of a given range, the position and the height in the vertical direction of the window are limited by the scanning region that is confined by reference lines, and it is thereby possible to improve the recognition accuracy and reduce the processing load. Note that, in the case where one reference line is set by the setting unit 13, the area between the set reference line and the upper end or the lower end of the acquired image may be specified as the scanning region. In this case, one of the position and the height in the vertical direction of the recognition window is specified by the position of the reference line.

In the character classifier according to this embodiment, the score of each character is obtained for the set window (candidate region) based on the HOG feature. Specifically, character recognition is performed by classifying the candidate region into 62 classes (all uppercase alphabetic characters and lowercase alphabetic characters and numeric characters 0 to 9) corresponding to the number of character sets. Further, in addition to the HOG feature, the aspect ratio of the candidate region may be further used as the feature quantity.

Figure 9:
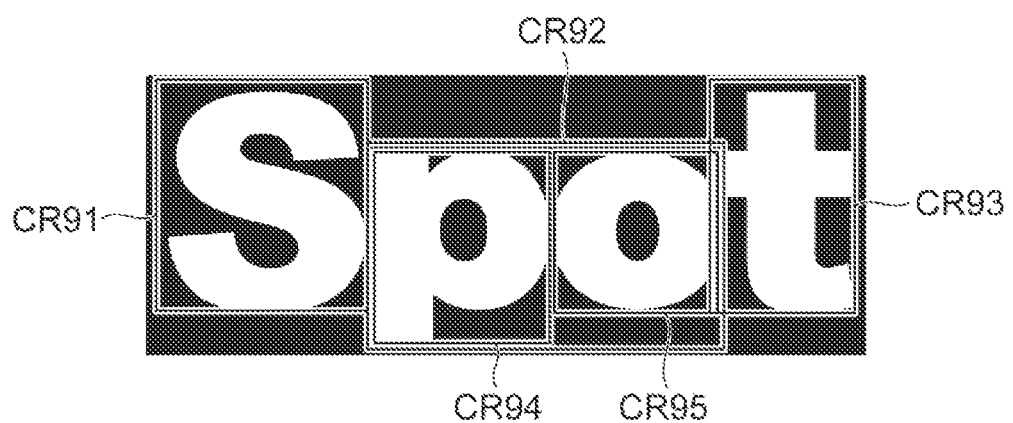
FIG. 9 is a view showing an example of character recognition by a second recognition method.

FIG. 9 is a view showing an example of a recognition result by the second recognition unit 14. As shown in FIG. 9, the second recognition unit 14 recognizes, by the second recognition method, the character C91 recognized as the uppercase alphabetic character "S", the character C92 recognized as the lowercase alphabetic character "x" (false recognition of the lowercase alphabetic character "po"), the character C93 recognized as the lowercase alphabetic character "t", the character C94 recognized as the lowercase alphabetic character "p", and the character C95 recognized as the lowercase alphabetic character "o".

The second recognition unit 14 may calculate a second reliability score indicating the probability of a recognition result for each recognized character. The second reliability score is used for output of a word in the output unit 15.

Note that the second recognition unit 14 may perform recognition processing only in the region where the first reliability score is less than a specified value in the recognition processing by the first recognition unit 12. In this case, recognition processing by the second recognition method is not performed again for a character with high reliability in a recognition result among the characters recognized by the first recognition method, thereby reducing the amount of processing.

Note that, although a scanning region is specified by two reference lines among a plurality of reference lines that are set by the setting unit 13, and the position and the height in the vertical direction of a recognition window are set to the position and the height of the specified scanning region in this embodiment, it is not limited thereto. For example, the upper end or the lower end of the recognition window may be set to near the position of the reference line, rather than being set to completely coincide with the upper end or the lower end of the scanning region (the position of the reference line).

The output unit 15 is a part that outputs, as a recognition result, a word composed of characters recognized by the second recognition unit 14. To be specific, the output unit 15 outputs, as a recognition result, a word made up of a character string that is formed based on the second reliability score of each of characters recognized by the second recognition unit 14.

Figure 10:
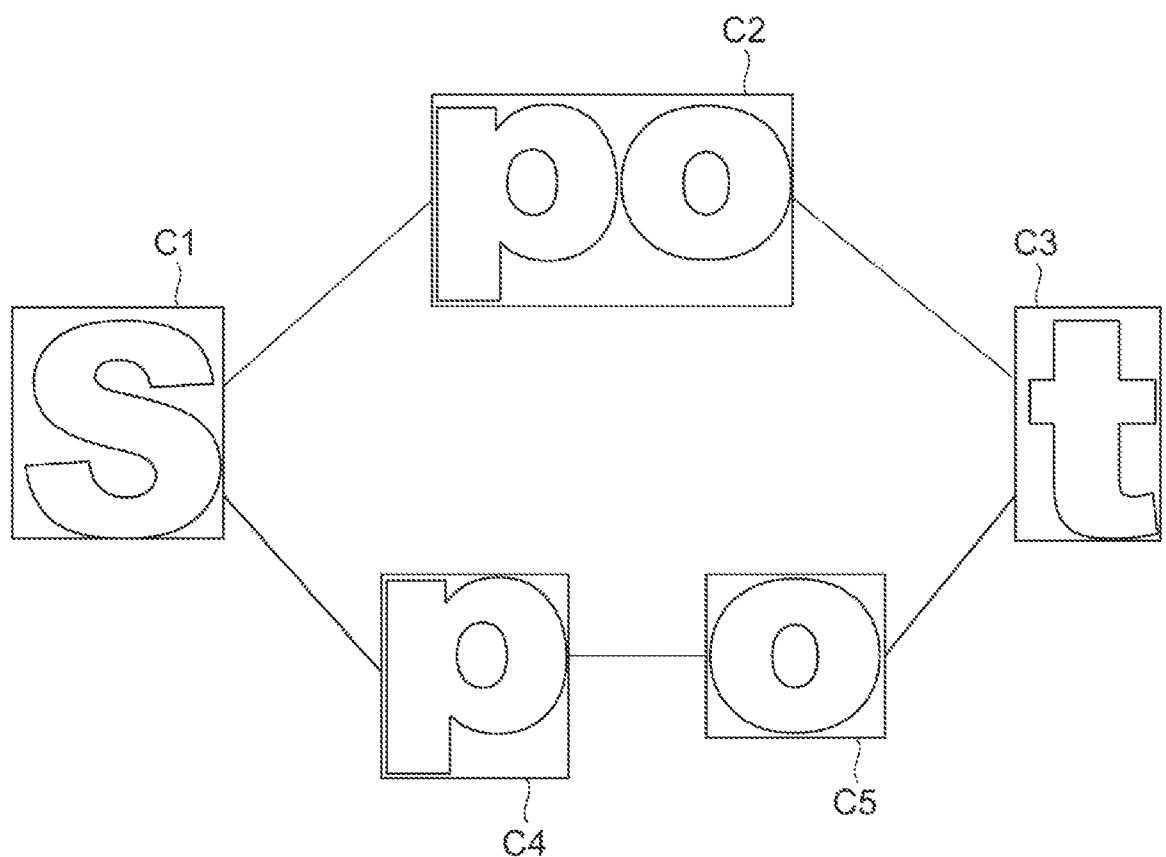
FIG. 10 is a view showing an example of a word composed of recognized characters.

FIG. 10 is a view showing an example of output a word by the output unit 15. The output unit 15 may output, as a word of a recognition result, a character string that is composed of characters whose second reliability score is equal to or more than a specified value. To be specific, as described earlier with reference to FIG. 9, in the case where the character C1 "S", the character C2 "x", the character C3 "t", the character C4 "p" and the character C5 "o" are recognized by the second recognition unit 14 and when the second reliability scores of the characters C1, C4, C5 and C3 are equal to or more than a specified value and the second reliability score of the character C2 is less than the specified value, the output unit 15 outputs, as a word of a recognition result, the character string "Spot" that is composed of the characters C1, C4, C5 and C3. In this manner, because a character string composed of characters with high reliability in a recognition result is output as a word of a recognition result, the accuracy of the output word increases.

Further, the output unit 15 may calculate an evaluation score indicating the likelihood as a word composed of a plurality of characters recognized by the second recognition unit 14, and output a word as a recognition result based on the calculated evaluation score.

This evaluation score may be calculated by a known technique called n-gram. In the case of applying the technique of n-gram to this embodiment, the evaluation score indicating the likelihood as a word is calculated by preparing a model that aggregates the co-occurrence frequency of a combination of n-number of adjacent character strings for each combination with use of dictionary data of English words composed of alphabetic characters as the learning data, and applying this model to a word composed of characters recognized by the second recognition unit 14, for example. Thus, this evaluation score is higher for a word made up of a character array with higher co-occurrence frequency.

The output unit 15 can calculate the evaluation score on the basis of the n-gram model for each of the word "Sxt" composed of the characters C1, C2 and C3 and the word "Spot" composed of the characters C1, C4, C5 and C3, and the output unit 15 may output the "Spot" composed of the characters C1, C4, C5 and C3 as a word of a recognition result when a higher evaluation score is calculated for the word "Spot" than for the word "Sxt". Further, the output unit 15 may determine a word to be output as a recognition result based on both of the second reliably score for each character and the evaluation score indicating the likelihood as a word.

Note that, in the case where the second recognition unit 14 performs recognition only in a region where a character whose first reliability score is less than a specified value is shown, the output unit 15 outputs a word composed of characters recognized by the first recognition unit 12 and the second recognition unit 14 as a recognition result. In this manner, because a word of a recognition result is output based on the likelihood as a word composed of a plurality of characters, the recognition accuracy as a word increases.

Figure 11:
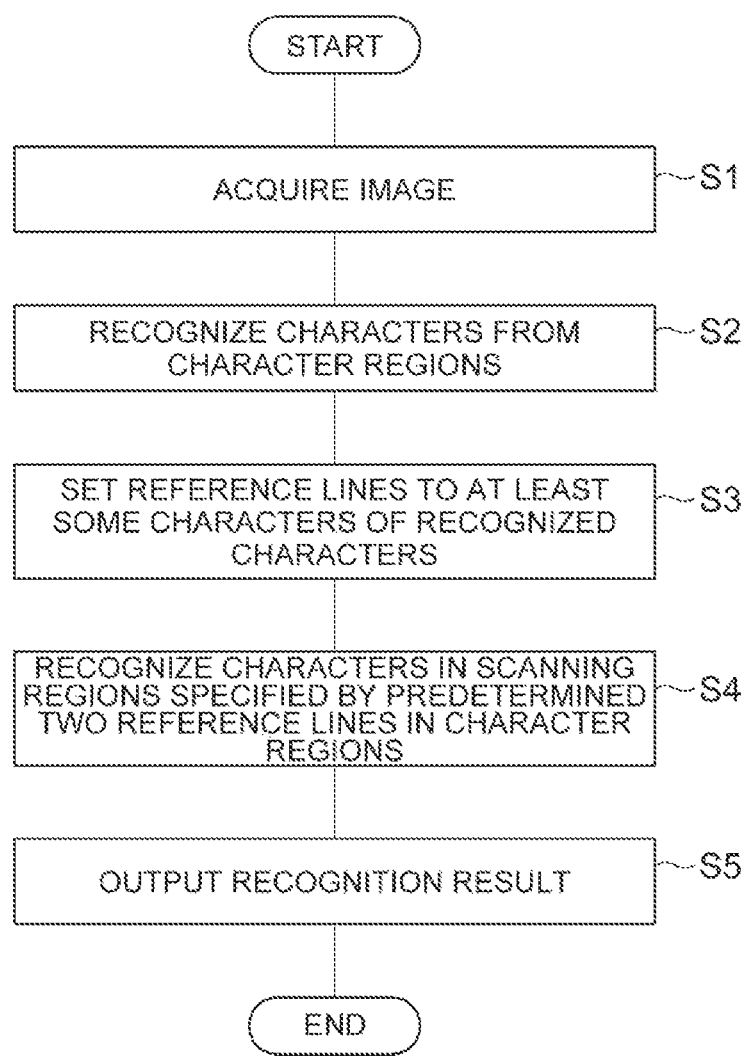
FIG. 11 is a flowchart showing a process of a character recognition method performed in the character recognition device.

The operation of the character recognition device 1 according to this embodiment is described hereinafter with reference to FIG. 11. FIG. 10 is a flowchart showing a process of a character recognition method performed in the character recognition device 1.

First, the acquisition unit 11 acquires an image containing character regions (S1). Next, the first recognition unit 12 recognizes characters from the character regions contained in the image by the first recognition method (S2).

Then, the setting unit 13 sets, for at least some of a plurality of characters recognized by the first recognition unit 12 in Step S2, at least two reference lines that are along the alignment direction of the plurality of characters and pass through a specified position in each character (S3). For example, the setting unit 13 sets four reference lines: the ascender line, the mean line, the base line and the descender line.

After that, the second recognition unit 14 recognizes characters by the second recognition method in scanning regions in the character regions which are specified by predetermined two reference lines out of the plurality of reference lines (S4). The output unit 15 than outputs a word composed of characters recognized by the second recognition unit 14 as a recognition result (S5).

Figure 12:
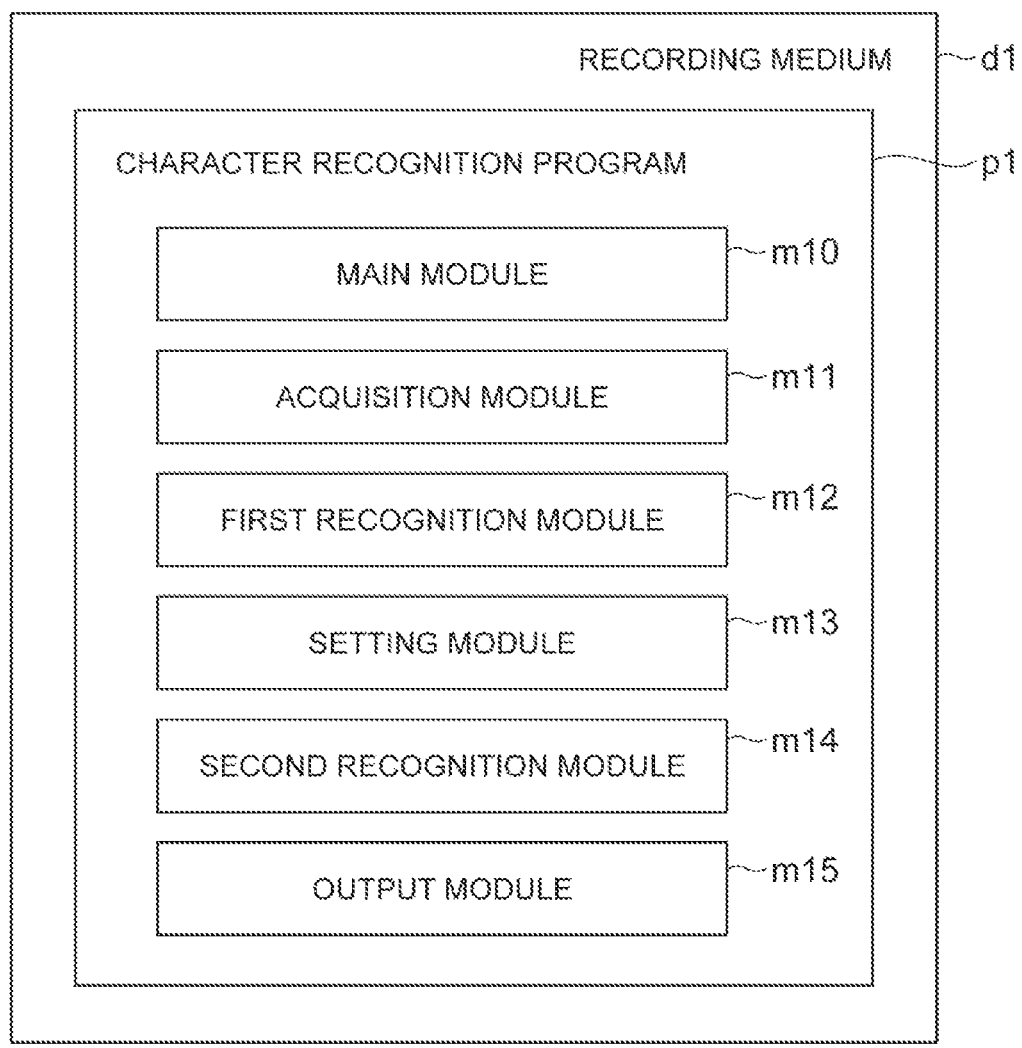
FIG. 12 is a view showing a configuration of a character recognition program.

A character recognition program that causes a computer to function as the character recognition device 1 is described hereinafter with reference to FIG. 12. A character recognition program p1 includes a main module m10, an acquisition module m11, a first recognition module m12, a setting module m13, a second recognition module m14, and an output module m15.

The main module m10 is a part that exercises control over the character recognition processing. The functions implemented by executing the acquisition module m11, the first recognition module m12, the setting module m13, the second recognition module m14 and the output module m15 are respectively equal to the functions of the acquisition unit 11, the first recognition unit 12, the setting unit 13, the second recognition unit 14 and the output unit 15 of the character recognition device 1 shown in FIG. 1.

The character recognition program p1 is provided by a storage medium d1 such as CD-ROM, DVD-ROM or semiconductor memory, for example. Further, the character recognition program p1 may be provided as a computer data signal superimposed onto a carrier wave through a communication network.

In the character recognition device 1, the character recognition method and the character recognition program p1 according to this embodiment described above, reference lines are set for characters recognized from character regions by the first recognition method. Then, a range where character recognition is carried out by the second recognition method is limited to scanning regions that are specified by the set reference lines, and it is thereby possible to reduce the load on recognition processing. Further, because character recognition processing is performed in limited regions having high probability of showing characters in the character regions, it is possible to maintain the recognition accuracy.

An embodiment of the present invention is described in detail above. However, the present invention is not limited to the above-described embodiment. Various changes and modifications may be made to the present invention without departing from the scope of the invention.

REFERENCE SIGNS LIST

1 . . . character recognition device, 11 . . . acquisition unit, 12 . . . first recognition unit, 13 . . . setting unit, 14 . . . second recognition unit, 15 . . . output unit, 21 . . . recognition processing information storage unit, 22 . . . reference line position storage unit, d1 . . . storage medium, m10 . . . main module, m11 . . . acquisition module, m12 . . . first recognition module, m13 . . . setting module, m14 . . . second recognition module, m15 . . . output module, p1 . . . character recognition program

The invention claimed is:

1. A character recognition device comprising:
at least one memory operable to store computer program code;
at least one processor operable to read said program code and operate according to said program code, said program code including:
acquisition code configured to cause at least one of said at least one processor to acquire an image;
first recognition code configured to cause at least one of said at least one processor to identify a plurality of character regions in the image and recognize a character from each of the plurality of character regions of the image by a first recognition method;
setting code configured to cause at least one of said at least one processor to set, for at least some of a plurality of characters recognized by the first recognition code, at least one reference line along an alignment direction of the plurality of characters and passing through a specified position in each character;
second recognition code configured to cause at least one of said at least one processor to recognize a character by a second recognition method, the second recognition method being a method that recognizes a character from an image within a recognition window by scanning in a recognition target region in an image while changing a size of the recognition window, and configured to set a position or a height in a vertical direction of the recognition window based on at least one reference line out of the reference lines set by the setting code; and
output code configured to cause at least one of said at least one processor to output, as a recognition result, a word composed of characters recognized by the second recognition code, wherein
the setting code is further configured to cause at least one of said at least one processor to set at least two reference lines, and
the second recognition code is further configured to cause at least one of said at least one processor to set the position and the height in the vertical direction of the recognition window to a position and a height of a scanning region specified by predetermined two reference lines out of the at least one reference line set by the setting code.

2. The character recognition device according to claim 1, wherein
the setting code is further configured to cause at least one of said at least one processor to set the at least one reference line for the plurality of characters by referring to a storage means that stores information about a position of each reference line for each character.

3. The character recognition device according to claim 1, wherein
the first recognition code is further configured to cause at least one of said at least one processor to calculate a first reliability score indicating probability of a recognition result for each recognized character, and
the setting code is further configured to cause at least one of said at least one processor to set the at least one reference line for a character where the first reliability score is equal to or more than a specified value.

4. The character recognition device according to claim 3, wherein
the second recognition code is further configured to cause at least one of said at least one processor to perform character recognition in a region showing a character where the first reliability score is less than the specified value, and
the output code is further configured to cause at least one of said at least one processor to output, as a recognition result, a word composed of characters recognized by the first recognition code and the second recognition code.

5. The character recognition device according to claim 1, wherein
the second recognition code is further configured to cause at least one of said at least one processor to calculate a second reliability score indicating probability of a recognition result for each recognized character, and
the output code is further configured to cause at least one of said at least one processor to output, as a recognition result, a word made up of a character string formed based on the second reliability score of each character.

6. The character recognition device according to claim 1, wherein
the output code is further configured to cause at least one of said at least one processor to calculate an evaluation score indicating likelihood as a word composed of characters recognized by the second recognition code, and output a word as a recognition result based on the calculated evaluation score.

7. The character recognition device according to claim 1, wherein
the characters are alphabets, and
the setting code is further configured to cause at least one of said at least one processor to set, as the at least one reference line, an ascender line, a mean line, a base line and a descender line.

8. The character recognition device according to claim 7, wherein
the second recognition code is further configured to cause at least one of said at least one processor to specify, as a scanning region, an area between the ascender line and the base line, an area between the mean line and the base line, and an area between the mean line and the descender line.

9. A character recognition method in a character recognition device, executed by at least one processor in said character recognition device and comprising:
acquiring an image;
identifying a plurality of character regions in the image;
recognizing a character from each of the plurality of character regions of the image by a first recognition method;
setting, for at least some of a plurality of characters recognized in the recognizing of the character by the first recognition method, at least one reference line along an alignment direction of the plurality of characters and passing through a specified position in each character;
recognizing a character by a second recognition method, the second recognition method being a method that recognizes a character from an image within a recognition window by scanning in a recognition target region in an image while changing a size of the recognition window, and setting a position or a height in a vertical direction of the recognition window based on at least one reference line out of the reference lines set in the setting of the at least one reference line; and
outputting, as a recognition result, a word composed of characters recognized in the recognizing of the character by the second recognition method,
wherein the setting of the at least one reference line further includes setting at least two reference lines, and
wherein the recognizing of the character by the second recognition method further includes setting the position and the height in the vertical direction of the recognition window to a position and a height of a scanning region specified by predetermined two reference lines out of the at least one reference line.

10. A character recognition device comprising:
at least one memory operable to store computer program code;
at least one processor operable to read said program code and operate according to said program code, said program code including:
acquisition code configured to cause at least one of said at least one processor to acquire an image;
first recognition code configured to cause at least one of said at least one processor to identify a plurality of character regions in the image, recognize a character from each of the plurality of character regions of the image by a first recognition method, and identify a first reliability score corresponding to each of the plurality of character regions;
setting code configured to cause at least one of said at least one processor to identify a first character region and a second character region that have corresponding first reliability scores above a threshold value, and set at least two reference lines along an alignment direction of a first character of the first character region and a second character of the second character region;
second recognition code configured to cause at least one of said at least one processor to identify a third character region that has a corresponding first reliability score that is below the threshold value, recognize a third character in the third character region by a second recognition method, the second recognition method being a method that is different than the first recognition method and is based on the at least two reference lines set by the setting code; and
output code configured to cause at least one of said at least one processor to output, as a recognition result, a word composed of the first character, the second character and the third character.

11. The character recognition device according to claim 10, wherein the second recognition method is a method that recognizes a character from an image within a recognition window by scanning in a recognition target region in an image while changing a size of the recognition window, and
wherein the second recognition code is further configured to cause at least one of said at least one processor to set a position or a height in a vertical direction of the recognition window based on at least one reference line out of the reference lines set by the setting code in the character region.

* * * * *